(12) United States Patent
Clark et al.

(10) Patent No.: US 10,175,348 B2
(45) Date of Patent: Jan. 8, 2019

(54) USE OF RANGE-RATE MEASUREMENTS IN A FUSION TRACKING SYSTEM VIA PROJECTIONS

(71) Applicant: SRC, Inc., North Syracuse, NY (US)

(72) Inventors: Barry L. Clark, Manlius, NY (US); Andrew D. Keckler, Jamesville, NY (US); Thomas A. Houman, Jaffrey, NH (US)

(73) Assignee: SRC, INC., North Syracuse, NY (US)

( * ) Notice: Subject to any disclaimer, the term of this patent is extended or adjusted under 35 U.S.C. 154(b) by 413 days.

(21) Appl. No.: 14/878,558

(22) Filed: Oct. 8, 2015

(65) Prior Publication Data

US 2016/0103214 A1 Apr. 14, 2016

Related U.S. Application Data

(60) Provisional application No. 62/061,325, filed on Oct. 8, 2014.

(51) Int. Cl.
*G01S 13/42* (2006.01)
*G01S 13/87* (2006.01)
(Continued)

(52) U.S. Cl.
CPC .............. *G01S 13/42* (2013.01); *G01S 13/58* (2013.01); *G01S 13/723* (2013.01); *G01S 13/87* (2013.01)

(58) Field of Classification Search
USPC .................................................. 342/59, 95
See application file for complete search history.

(56) References Cited

U.S. PATENT DOCUMENTS 4,899,161 A * 2/1990 Morin, Jr. ............. G01S 7/2955
342/180
5,138,321 A * 8/1992 Hammer ............... G01S 13/726
342/36
(Continued)

OTHER PUBLICATIONS

Bizup, D., Brown, D., Maneuver Detection Using the Radar Range Rate Measurement, IEEE Transactions On Aerospace And Electronic Systems, Jan. 1, 2004, vol. 40, No. 1, pp. 330-336.
(Continued)

*Primary Examiner* — Marcus E Windrich
(74) *Attorney, Agent, or Firm* — Bond Schoeneck & King, PLLC; George McGuire (57) ABSTRACT

A target is located and a track is associated with the target in the fusion coordinate system. An estimate/prediction of the target's velocity is developed within the tracker, as well as $\vec{T}$, a vector representing the distance from the fusion center to the target as estimated by the tracker, and $\vec{S}$, a vector representing the known distance from the fusion center to the sensor. The sensor's range vector, $\vec{R}$ (the distance from the sensor to the target as predicted by the tracker) is transformed to fusion coordinates. Using the sensor's range vector, normalized to unit length, in fusion coordinates and the estimated target's velocity, an estimate of the target's speed projected in the direction of $\vec{R}$ is derived. The estimated range-rate is compared per update to the sensor's measured range-rate in the form of an error measurement. The error is then used to correct the track's velocity prediction.

20 Claims, 4 Drawing Sheets

(51) Int. Cl.
*G01S 13/58* (2006.01)
*G01S 13/72* (2006.01)

(56) References Cited

U.S. PATENT DOCUMENTS

| | | | | |
|---|---|---|---|---|
| 5,414,643 | A * | 5/1995 | Blackman | G01S 13/726 342/95 |
| 5,579,009 | A * | 11/1996 | Nilsson-Almqvist | F42C 13/02 342/53 |
| 6,359,586 | B1 * | 3/2002 | Sviestins | G01S 7/4004 342/195 |
| 6,445,344 | B1 | 9/2002 | Wise et al. | |
| 6,794,987 | B2 | 9/2004 | Schiffmann et al. | |
| 6,989,754 | B2 | 1/2006 | Kisacanin | |
| 7,183,969 | B2 * | 2/2007 | Pozgay | G01S 7/4004 342/145 |
| 7,394,046 | B2 | 7/2008 | Olsson et al. | |
| 7,706,963 | B2 | 4/2010 | Parikh et al. | |
| 7,719,461 | B1 * | 5/2010 | Mookerjee | G01S 7/003 342/107 |
| 7,924,146 | B2 | 4/2011 | Seder et al. | |
| 7,940,206 | B2 * | 5/2011 | Nohara | G01S 7/003 342/59 |
| 8,077,074 | B2 * | 12/2011 | Venkatachalam | G01S 7/003 342/104 |
| 8,089,393 | B2 * | 1/2012 | Nettleton | G01S 7/003 342/175 |
| 8,134,493 | B2 | 3/2012 | Noble et al. | |
| 8,188,919 | B2 | 5/2012 | Grabbe et al. | |
| 8,190,330 | B2 | 5/2012 | Lee | |
| 8,654,005 | B2 * | 2/2014 | Christopher | G01S 13/72 342/137 |
| 8,830,115 | B2 * | 9/2014 | Baud | G01S 13/91 342/36 |
| 8,970,429 | B2 * | 3/2015 | Pickle | G01S 13/726 342/159 |
| 2004/0233105 | A1 | 11/2004 | Benner et al. | |

OTHER PUBLICATIONS

Floudas, N., Polychronopoulos, A.A., A Survey Of Filtering Techniques For Vehicle Tracking by Radar Equipped Automotive Platforms, 7th International conference on Information Fusion (FUSION), 2005, pp. 1436-1443.

Hernandez, M., Benavoli, A., Graziano, A., Farina, A., Morelande, M., Performance Measures and MHT For Tracking Move-Stop-Move Targets with MTI Sensors, IEEE Transactions On Aerospace And Electronic Systems, 2011, vol. 47, No. 2, pp. 996-1025.

Kosuge, Y., Iwama, H., Miyazaki, Y., A Tracking Filter for Phased Array Radar With Range Rate Measurement, IECON, 1991, pp. 2555-2560.

Sinha, A., Kirubarajan, T., Bar-Shalom, Y., Autonomous Ground Target Tracking by Multiple Cooperative UAVs, IEEE, 2005, IEEEAC Paper # 1307, pp. 1-9.

Wang, J., He, P., Long, T., Use Of The Radial Velocity Measurement In Target Tracking, IEEE Transactions On Aerospace And Electronic Systems, Apr. 2003, vol. 39., No. 2, pp. 401-413.

Wang, X., Musicki, D., Ellem, R., Fletcher, F., Enhanced Multi-Target Tracking with Doppler Measurements, IEEE, 2007, pp. 53-58.

* cited by examiner

USE OF RANGE-RATE MEASUREMENTS IN A FUSION TRACKING SYSTEM VIA PROJECTIONS

CROSS-REFERENCE TO RELATED APPLICATIONS

This application claims priority to U.S. Provisional Patent Application Ser. No. 62/061,325, filed on Oct. 8, 2014 and entitled "Use of Range-Rate Measurements in a Fusion Tracking System Via Projections," the entire disclosure of which is incorporated herein by reference.

GOVERNMENT FUNDING

This invention was made with Government support under Base Protect Project Number DO251. The United States Government has certain rights in the invention.

FIELD OF THE INVENTION

The present invention relates to a radar system that employs a radar tracker, and more particularly, to a radar system that uses range-rate measurements to update a radar tracker's filter state.

BACKGROUND

The term radar is an acronym that stands for "radio detection and ranging." A radar system transmits radio frequency (RF) signals in a predetermined direction (i.e., a bearing or angle-of-arrival) with the intention of contacting or illuminating moving objects ("contacts"). When the transmitted radar signal illuminates a contact, a return signal is reflected back toward the radar receiver. The return signal is detected if the return signal is stronger than any noise signals that may be present in the receiver. A contact's bearing corresponds to the direction of the transmitted radar signal because the signal travels at the speed of light. The distance, or "range," is determined by measuring the time between signal transmission and the reception of the return signal. Thus, radar systems are commonly used in commercial and military settings for purposes of identifying and tracking a radar contacts within a predetermined search volume.

Radar trackers are established components of radar systems. As radar systems receive reflected signals, or plots, from targets, radar trackers associate the most recent plot with prior plots from the same target. Associating several plots in this way creates a track representing the path a given target has followed. By creating these tracks for each target, radar systems are better able to reject false positives, to estimate the current speed and heading of a target, to remove measurement error from positions estimates, and to identify the paths and origins of multiple unique targets, among other benefits. Furthermore, radars tracker may also improve the accuracy of each received signal from a given target, by shifting it to fit a smooth curve with the target's established track. In this way, ambiguities or inaccuracies in each received signal can be accounted for and corrected.

Accuracy and range may be further improved with a radar tracker by associating multiple radar systems to a single tracker; this is known as a multi-radar or fusion tracking. Fusion tracking systems offer a number of advantages over single-sensor radar, because they can provide improved accuracy based on geometric diversity and an improved update rate, particularly if the sensors are transmitting asynchronously. Furthermore, multiradar systems can track targets when one sensor is blocked by terrain, or the target is out of range, if the other sensor maintains a clear view of the target.

In fusion tracking systems, it is necessary to the convert the coordinate system of the sensors to a central, often Cartesian, coordinate system. This is because each sensor naturally uses a spherical coordinate system that is centered around itself, providing measurements of range, azimuth angle, elevation angle, and range-rate. Thus to combine each sensor in a fusion system, the data from at least some sensors need to be transferred into another, common coordinate system, not referenced to those sensors.

While some of the data from each sensor may be easily transferred, range-rate may not be easily transformed into another coordinate system because it represents only a component of velocity, and is implicitly referenced to the sensor. Some methods have been developed to utilize range-rate in a fusion tracking system; however, these methods are inefficient and prohibitively computationally intensive.

Accordingly, there is a continued need in the art for a fusion tracking system that utilizes range-rate in an effective and computationally efficient manner.

SUMMARY OF THE INVENTION

The present disclosure is directed to novel radar methods and systems. According to embodiments described or otherwise envisioned herein, the novel methods and systems are directed to calculation of a target's velocity using range-rate measurement. Range-rate is a component of a target's velocity and is relative to the geometry between the sensor location and the target location. In a multi-sensor system, the measurements are converted to a common coordinate system. The range vector is described in the new coordinate space, to give direction as well as magnitude to the range-rate measurement. The tracking filter then projects velocity measurements onto this vector to utilize the range-rate measurements to update the filter state.

According to an aspect is provided a method for calculating a target's velocity using range-rate measurement. The method includes the steps of: (i) providing a system comprising a plurality of radars each configured to obtain sensor data for at least one target, and a processor in communication with the plurality of radars, wherein the processor comprises a tracking filter; (ii) obtaining, with the plurality of radars, sensor data regarding the target, wherein the sensor data comprises a range-rate measurement; (iii) transmitting the obtained sensor data to the processor; (iv) generating, by the processor utilizing a pulse-repetition interval of the system, a range hypothesis and a range-rate hypothesis for the target; (v) converting, by the processor, at least some of the obtained sensor data from the plurality of radars to a common coordinate system; (vi) predicting, by the tracking filter using the obtained sensor data, a first track state for the target, wherein said prediction comprises an estimate of a position of the target and an estimate of a velocity of the target; (vii) determining, by the processor, a distance to the target from each radar of the plurality of radars to obtain a first estimated position with respect to each radar of the plurality of radars; (viii) determining, by the processor using the determined distances, an estimate of a velocity of the target in the direction of each radar of the plurality of radars; (ix) determining an error measurement by comparing the estimated velocity in the direction of each radar of the plurality of radars to the range-rate hypothesis for the target; and (x) updating the predicted first track state with the determined error measurement to generate a second track state for the target.

According to an embodiment, the plurality of radars is in wireless communication with the processor.

According to an embodiment, the obtained sensor data comprises one or more of the following: range of the target, range-rate of the target, azimuth angle of the target, and an elevation angle of the target.

According to an embodiment, the common coordinate system is a Cartesian coordinate system.

According to an embodiment, the step of determining a distance of each radar of the plurality of radars to the target comprises the formula $$\vec{R} = \vec{T} - \vec{S}$$

where $\vec{R}$ is the distance from each radar to the target, $\vec{T}$ is a predicted distance from the processor to the target, and $\vec{S}$ is the distance from the processor to the radar.

According to an embodiment, the estimate of a velocity of the target in the direction of each radar of the plurality of radars is determined using the formula $$\dot{R} = \vec{V} \cdot \frac{\vec{R}}{|\vec{R}|} = \vec{V} \cdot \frac{(\vec{T} - \vec{S})}{|\vec{T} - \vec{S}|}$$

where $\vec{R}$ is the distance from each radar to the target, $\vec{T}$ is a predicted distance from the processor to the target, and $\vec{S}$ is the distance from the processor to a radar.

According to an embodiment, the processor comprises a Kalman filter.

According to an aspect is a system including a processor, and a plurality of radars each configured to obtain sensor data for at least one target, wherein the sensor data comprises a range-rate measurement, and further wherein the plurality of radars are configured to transmit obtained sensor data to the processor. The processor is configured to: (i) generate a range hypothesis and a range-rate hypothesis for the target utilizing obtained sensor data; (ii) convert at least some of the obtained sensor data from the plurality of radars to a common coordinate system; (iii) predict a first track state for the target, wherein said prediction comprises an estimate of a position of the target and an estimate of a velocity of the target; (iv) determine a distance from each of the plurality of radars to the target to obtain a first estimated position; (v) determine an estimate of a velocity of the target in the direction of each of the plurality of radars; (vi) determine an error measurement by comparing the estimated velocity to the range-rate hypothesis for the target; and (vii) update the predicted first track state with the determined error measurement to generate a second track state for the target.

According to an aspect is a tracking system including a processor configured to receive sensor data for at least one target from a plurality of radars, wherein the sensor data comprises a range-rate measurement. The processor is further configured to: (i) generate a range hypothesis and a range-rate hypothesis for the target utilizing obtained sensor data; (ii) convert at least some of the obtained sensor data from the plurality of radars to a common coordinate system; (iii) predict a first track state for the target, wherein said prediction comprises an estimate of a position of the target and an estimate of a velocity of the target; (iv) determine a distance from each of the plurality of radars to the target to obtain a first estimated position; (v) determine an estimate of a velocity of the target in the direction of each of the plurality of radars; (vi) determine an error measurement by comparing the estimated velocity to the range-rate hypothesis for the target; and (vii) update the predicted first track state with the determined error measurement to generate a second track state for the target.

These and other aspects of the invention will be apparent from the embodiments described below.

BRIEF DESCRIPTION OF THE DRAWINGS

The present invention will be more fully understood and appreciated by reading the Following Detailed description of the invention in conjunction with the accompanying drawings, in which.

DETAILED DESCRIPTION

The present disclosure describes various embodiments of a radar system and method that calculates a target's velocity using range-rate measurement. The system receives data from at least one sensor, and is converted to a common coordinate system. The system also generates a track state, including a prediction of the target's location and velocity. The range vector is described in the new coordinate space, to give direction as well as magnitude to the range-rate measurement. The tracking filter then projects velocity measurements onto this vector to utilize the range-rate measurements to update the filter state.

Figure 1:
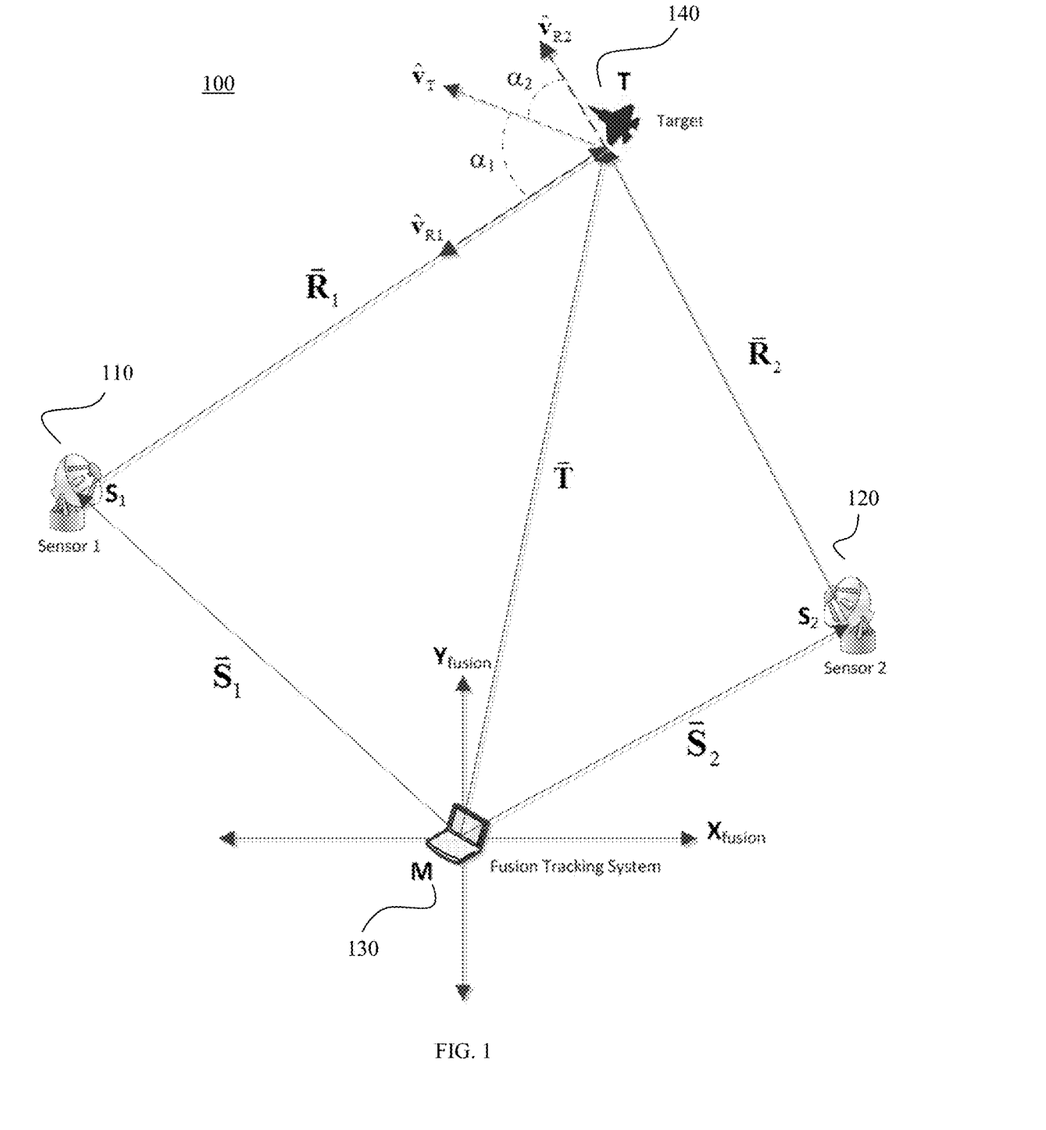
FIG. 1 is a block diagram of a fusion radar system, in accordance with an embodiment.

Referring now the drawings, wherein like reference numerals designate identical or corresponding parts throughout the several views, there is shown in FIG. 1 a radar system 100 comprising two sensors, $S_1$ (denoted by numeral 110) and $S_2$ (denoted by numeral 120), and a fusion tracking system M (denoted by numeral 130), which comprises, or is in communication with, the sensors 110 and 120. Sensors 110 and 120 are radars, and can be any radar known in the art now or in the future capable of obtaining data about a target. Although the embodiment presented in FIG. 1 comprises just two sensors, the multiradar tracking system could be scaled to use any number of sensors, including three or more.

For example, according to one embodiment, the one or more sensors 110, 120 include synthetic aperture radar (SAR) imaging devices which have high resolution to detect and track long extensible objects such as guard rails, concrete barriers, and trucks. Moreover, the SAR includes Doppler measurements that can be used to distinguish a stationary object from a dynamic object. After the objects are classified as stationary or dynamic, the objects can be tracked through contour matching between adjacent frames to constantly monitor orientation of the vehicle. It should be understood that the SAR is a form of radar whose defining characteristic is its use of relative motion (between an antenna and its target region) to provide distinctive long-term coherent-signal variations for exploiting spatial resolution in contrast to conventional radar systems. Although the one or more sensors 110, 120 may be SAR sensors, they may also be any other sensor that obtains similar data.

Sensors 110 and 120 are operatively connected to the tracking system 130, such that tracking system 130 receives data from sensors 110 and 120 either directly or indirectly. Accordingly, tracking system 130 is in communication with sensors 110 and 120, and the connection can be any suitable wired or wireless network capable of transmitting communication, including but not limited to the Internet, Intranet, local area network, Ethernet, online communication, offline communications, wireless communications, and/or similar communications method or means. The tracking system can be local to the sensors, or can be remote from the sensors. Additionally, the tracking system can be contemporaneous with the sensors, or can analyze the data at a later time or date. According to one embodiment, the tracking system 130 can be a processor which can optionally include one or more data storage components (not shown).

FIG. 1 also shows a target T (denoted by numeral 140) and a plurality of vectors between the target 140, sensors 110 and 120, and fusion tracking system 130. Although FIG. 1 depicts a single target, it will be recognized that the system may be tracking one or more targets 140.

Fusion tracking system 130 is connected to target 140 by vector $\vec{T}$, representing the distance from target 140 to the fusion tracking system 130. Fusion tracking system 130 is also connected to sensor 110 by vector $\vec{S}_1$, representing the known distance from fusion tracking system 130 to sensor 110, and to sensor 120 by the vector $\vec{S}_2$, representing the known distance from fusion tracking system 130 to sensor 120. Sensor 110 is connected to target 140 by vector $\vec{R}_1$, representing the range (distance) from target 110 to target 140. Similarly, sensor 120 is connected to target 140 by vector $\vec{R}_2$, representing the range (distance) from sensor 120 to target 140.

Fusion tracking system 130 is overlaid with a coordinate system, hereinafter the fusion coordinate system, representing the common Cartesian coordinate system of the fusion tracking system according to an embodiment, which is centered at the fusion tracking system and has axis labeled $Y_{fusion}$ and $X_{fusion}$. It will be recognized that centering the coordinate system at the fusion tracking system is arbitrary and could be centered at any point within the system. FIG. 1 also depicts a vector $\vec{v}_T$ representing the velocity of target 140, components of which may be represented by $\hat{v}_{R1}$ and $\hat{v}_{R2}$, which represent the portion of the velocity vector in the direction of $\vec{v}_1$ and $\vec{v}_2$, respectively.

Figure 2:
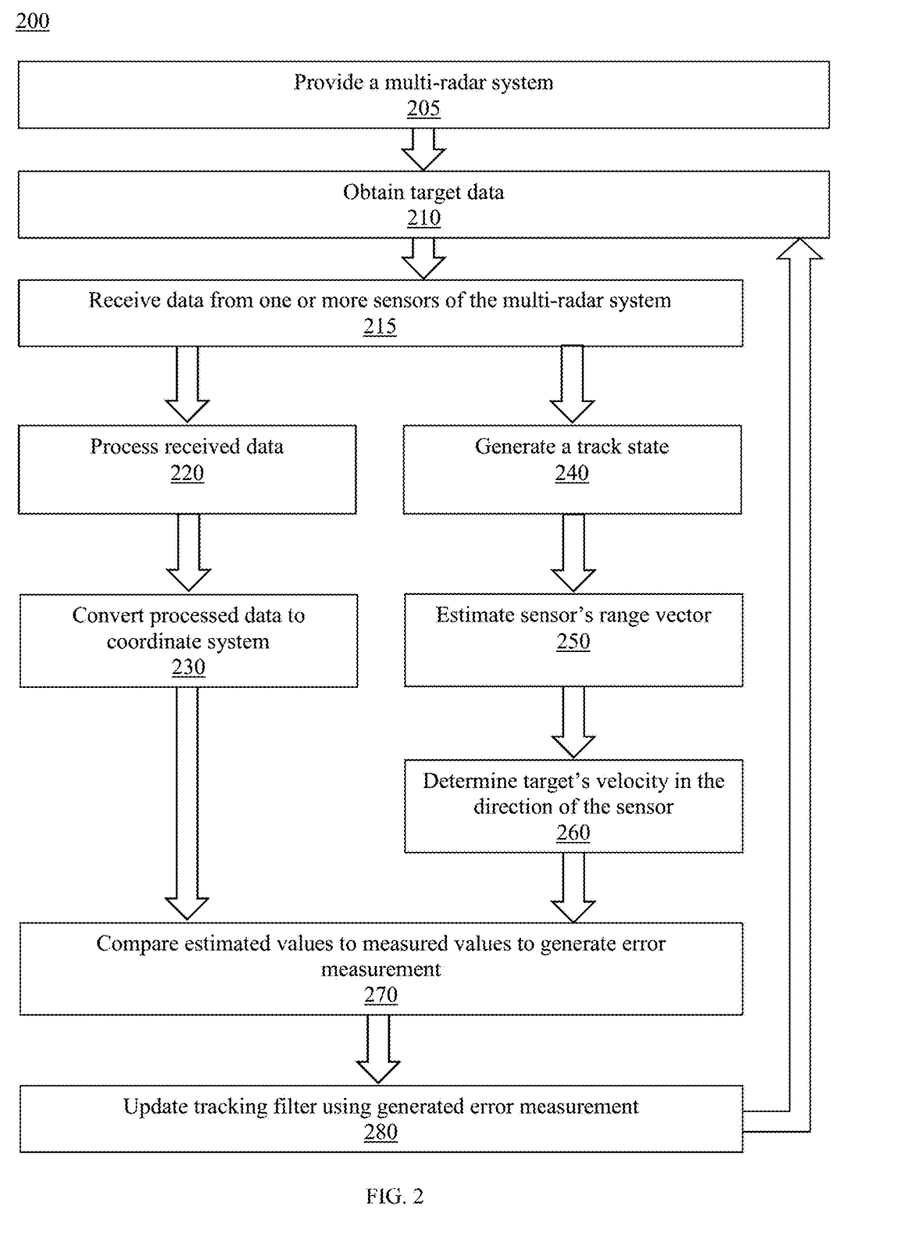
FIG. 2 is a flowchart of a method for calculating a target's velocity using range-rate, in accordance with an embodiment.

Referring to FIG. 2, in one embodiment, is a flowchart of a method 200 for processing data in a multi-radar system and using range-rate measurements to update the radar tracker's filter state. At step 205, a multi-radar system 100 is provided. The multi-radar system can include any of the elements described or otherwise envisioned herein, including but not limited to sensors 110 and 120, fusion tracking system 130, and target 140.

At step 210 of the method, the one or more sensors 110, 120 generate radar data. The sensors may be SAR sensors, or may be any sensor that obtains similar data.

At step 215, the one or more sensors 110, 120 transmit the radar data to the multi-radar tracking system 130. The data may be transmitted by the one or more sensors 110, 120, and received by the multi-radar tracking system 13, using one or more of a wired or wireless communication path or system, or by any other medium of communication sufficient for transmitting received data from a radar sensor.

According to an embodiment, the data received from the one or more sensors is in the sensors' native coordinates. In a preferred embodiment, for example, the data is in spherical coordinates and may comprise: range, range-rate, azimuth angle, elevation angle, and/or an estimate of the measurement error statistics. These data points are referenced to the sensor from which they were created. For example, the range-rate represents the Doppler shift of the received signal, and may be interpreted as the component of the target's velocity moving either toward or away from the sensor. Similarly, the range represents the distance from the sensor to the target. Some of the data, such as range and range-rate, may be ambiguous because, among other reasons, the return signal may have been received after the sensor has transmitted another pulse. Accordingly, in step 220 of the method, any ambiguous measurements are unfolded using the pulse-repetition interval, to create range and range-rate hypotheses. However, according to yet another embodiment, the measurements are not unfolded and remain ambiguous.

At step 230 of the method, in accordance with a preferred embodiment, the range hypotheses are converted to a fusion coordinate system. Methods for converting the range to a fusion coordinate system, such as Cartesian coordinates, are well-known in the art, and thus are not explained in detail herein. It should be understood that the range-rate cannot be converted directly into Cartesian coordinates because it does not form a complete set of coordinates of the target's velocity $\vec{v}_T$, rather the range-rate only represents a single component of the target's velocity.

In step 240 of the method, in accordance with an embodiment, using the data received from the sensor, a track state (e.g. position, heading, speed, acceleration, etc.) is predicted for the target by the tracking filter, providing estimates of the target's position, $\hat{P}_T$, and velocity, $\hat{v}_T$, (where a hat denotes a predicted value from the tracking filter). These estimates are in fusion coordinates. Thus, $\hat{P}_T$, can be interpreted as representing the distance from the fusion tracking system M to the predicted position of the target. Further, $\vec{v}_T$ may be interpreted as the predicted velocity of the target, moving in a direction relative the fusion center. These values are then incorporated in the tracking filter's predicted state vector, such that:

$$x(t_k|t_{k-1}) = [\hat{p}_T(t_k|t_{k-1})\hat{v}_T(t_k|t_{k-1})]^T \quad \text{(Eq. 1)}$$

At step 250 of the method, in accordance with an embodiment, the distance from the sensor(s) 110, 120 to target 140 is determined in the fusion coordinate system. As shown in FIG. 2, this distance is represented by the vector $\vec{R}$. $\vec{R}$, in Cartesian coordinates, may be estimated if $\vec{T}$ and $\vec{S}$ are also known, using the equation:

$$\vec{R} = \vec{T} - \vec{S} \quad \text{(Eq. 2)}$$

Thus, an estimate of the value of $\vec{R}$ can be obtained by substituting the value $\hat{P}_T$ (the predicted distance from the fusion tracking system to T) for $\vec{T}$, and the predetermined distance from the fusion tracking system to the sensor for $\vec{S}$. It should be noted that the equation for the range vector, $\vec{R}$ may be generalized for any n number of sensors as:

$$\vec{R}_n = \vec{T} - \vec{S}_n \qquad \text{(Eq. 3)}$$

where $\vec{R}_n$ is the vector from the $n^{th}$ sensor to the target, and $\vec{S}_n$ is the vector from the fusion tracking system to the $n^{th}$ sensor.

Next, in step 260 of the method, an estimate of the target's speed in the direction of the estimated value of $\vec{R}$ is obtained by taking the inner product of $\hat{v}_T$ and $\vec{R}$ normalized to unit length, (also represented as the unit vector of $\vec{T} - \vec{S}$, according to the equation as above), as follows:

$$\dot{R} = \vec{V} \cdot \frac{\vec{R}}{|\vec{R}|} = \vec{V} \cdot \frac{(\vec{T} - \vec{S})}{|\vec{T} - \vec{S}|} \qquad \text{(Eq. 4)}$$

According to the above steps, therefore, the sensor's range vector to the target has been transformed to Cartesian coordinates centered on the fusion tracking system, and used to find the portion of the velocity vector, $\hat{v}_T$, that matches the range-rate measurement originally taken by the sensor. According to an embodiment, the equation may be expanded and generalized for n sensors according to the following equation:

$$\hat{r}_n = \hat{v}_{\vec{R},n} = \frac{(\dot{x}_T x_T + \dot{y}_T y_T + \dot{z}_T z_T - \dot{x}_T x_{S,n} - \dot{y}_T y_{S,n} - \dot{z}_T z_{S,n})}{\sqrt{(x_T - x_{S,n})^2 + (y_T - y_{S,n})^2 + (z_T - z_{S,n})^2}} \qquad \text{(Eq. 5)}$$

where the subscripts T and S refer to elements from the target and sensor vectors, respectively, and where $\hat{v}_T$ is expanded as:

$$\vec{V}_T = [\dot{x}_T \dot{y}_T \dot{z}_T]^T \qquad \text{(Eq. 6)}$$

In step 270 of the method, in accordance with an embodiment, the target's estimated speed projected in the direction of $\vec{R}$, and found in the above equation, is then compared to the measured range-rate hypotheses, and the measured range hypotheses is compared to the predicted position, as a complete error measurement (hereinafter, residual error).

Next, in 280 of the method, the track state from step 240 is updated using the residual error. If the track is unambiguous, the position and range-rate measurement hypotheses that minimize the error are used. If the track has yet to resolve the ambiguities, then the measurement hypotheses that minimizes the error for each track hypothesis is used for that track hypothesis. In this way, the error is used to reject measurement hypotheses that do not belong with track hypotheses, to resolve ambiguities in the target's velocity. Similarly, the error is used to reject plots that do not belong with a track. For those that are accepted, the error is used to correct the track prediction and update the estimate of the target position and velocity.

The steps are repeated for each plot received at the sensor. Further, the steps above are repeated for each number of n sensors in the system when plots are received from these sensors.

Although the method is described in relation to range-rate in multi-radar systems, they may be generalized to any multisensory system that make partial measurements, and are applicable to systems that measure lines of bearing, or ones that measure components of acceleration. Further, the method is generally applicable to any fusion tracking system, in the preferred embodiment, the system is implemented using an extended Kalman filter. Described below, for example, are steps to update the extended Kalman filter using the residual error, according to a preferred embodiment.

Figure 3:
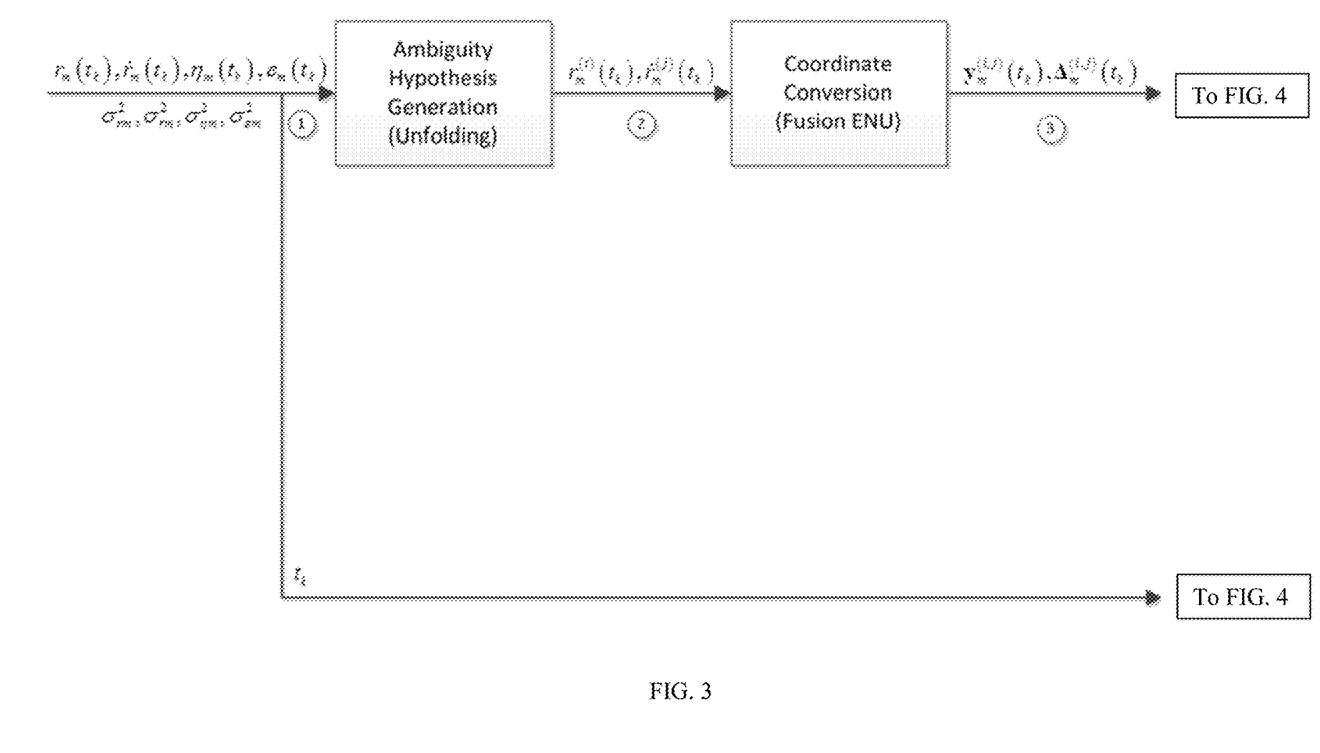
FIG. 3 is a diagram of a component of a method for calculating a target's velocity using range-rate, in accordance with an embodiment.
Figure 4:
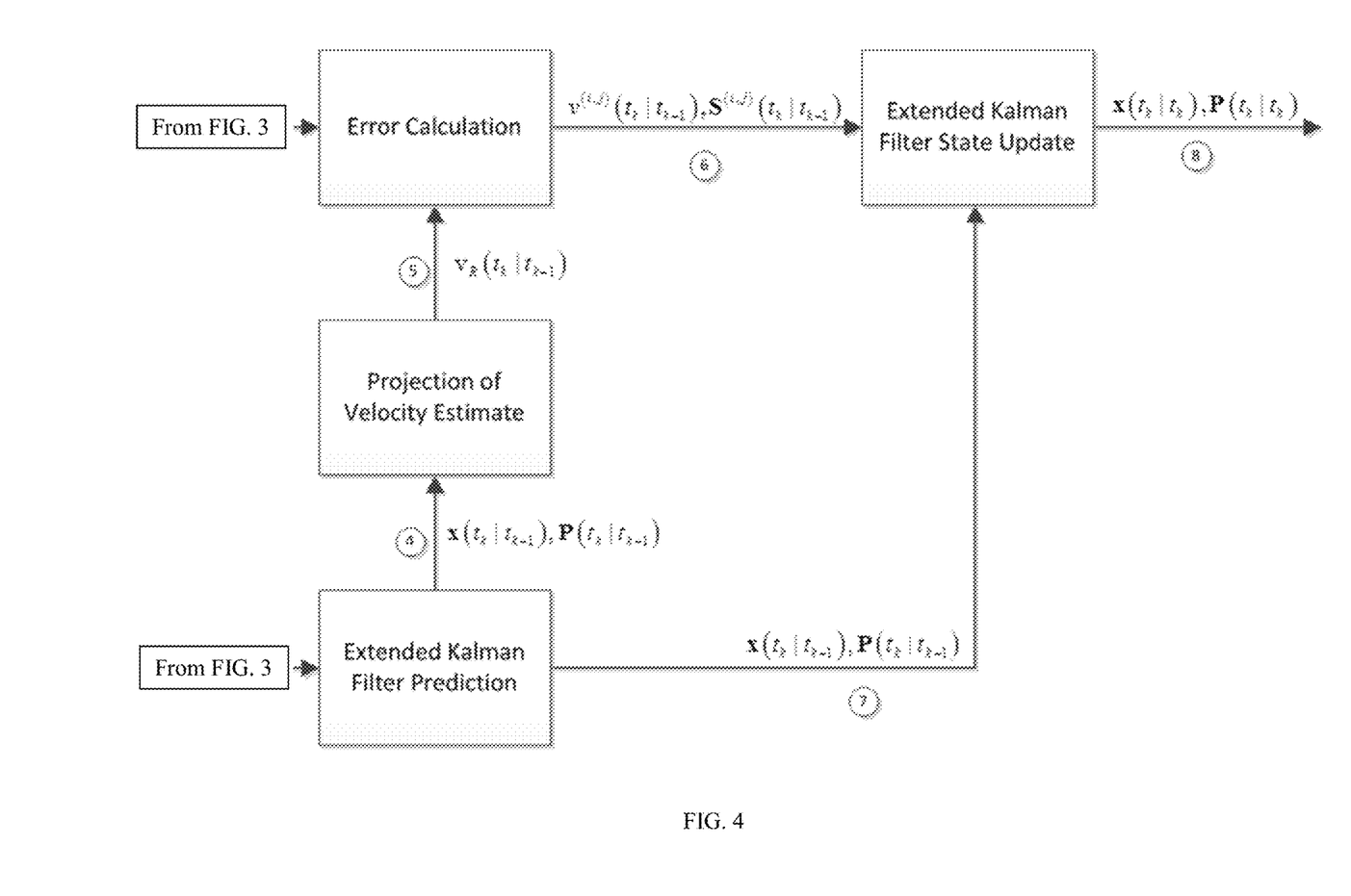
FIG. 4 is a diagram of a component of a method for calculating a target's velocity using range-rate, in accordance with an embodiment.

FIGS. 3 and 4 show an embodiment of Fusion tracking system 130 employing an extended Kalman filter. As shown in FIG. 3, Fusion tracking system 130 receives from a plurality of sensors located a known locations, a plurality of signals (output 1). From these signals, an ambiguous range and range-rate hypothesis (output 2) for each signal is formed by the Ambiguity Hypothesis Generation module. In an embodiment, this hypothesis is unfolded, according to known methods, in order to remove any ambiguity.

Because the data received from each sensor is in spherical coordinates, centered on the sensor, the range hypothesis of each sensor is converted into the Fusion coordinate system (output 3) by the Coordinate Conversion module. In other words, the range of each sensor is converted into a Cartesian coordinate system that, in an embodiment, is centered on the Fusion tracking system 130.

Using the signals received from the sensors and the most recent updated state of the Kalman filter, a current track state (e.g. position, heading, speed, acceleration) is predicted for the target by the extended Kalman filter (output 4) by the Extended Kalman Filter Prediction module.

As described in step 250 above, using the current track state and the known location of the sensors, the distance from the target to each of the sensors is determined in the Fusion coordinate system by the Projection of Velocity Estimate module. Using this distance, as described in step 260, the target's speed is estimated in the direction $\vec{R}$ of each of the sensors. In other words, using the track state, the range-rate of the target, in the direction of the target with respect to each of the sensors, is estimated for each sensor (output 5).

The estimated range-rate for each sensor is compared to the measured range-rate hypothesis for each sensor, and the measured range hypothesis is compared to the predicted position to form a complete error measurement (output 6) by the Error Calculation module. It will be understood that any of the metrics predicted in the predicted track state may be compared to the received data to form a complete error measurement.

From the outputted error measurement (output 6) and the filter prediction (output 7), the Kalman filter state may be updated by the Extended Kalman Filter State Update module. In order to update the track state with the residual error, it is necessary to calculate the Kalman gain, which requires the covariance matrix of the residual error. This is obtained from the following:

$$\Sigma(t_k|t_{k-1}) = H(t_k|t_{k-1})P(t_k|t_{k-1})H^T(t_k|t_{k-1}) + \Delta(t_k) \qquad \text{(Eq. 7)}$$

where here $\Sigma$ is the covariance matrix of the residual error, and $\Delta$ is the covariance matrix of the converted measurement error. Normally, the symbols S and R are used for these covariance matrices, but these symbols are substituted to avoid confusion with the sensor location and range vectors. For in the equation above, the observation matrix, H, is given by the following in the fusion system:

$$H_{r(t_k|t_{k-1})} = \frac{1}{r}\left[\dot{x}_T - \frac{(x_T - x_S)\dot{r}}{r} \quad \dot{y}_T - \right. \qquad \text{(Eq. 8)}$$

-continued
$$\frac{(y_T - y_T)\dot{r}}{r}\dot{z}_T - \frac{(z_T - z_S)\dot{r}}{r}(x_T - x_S)(y_T - y_S)(z_T - z_S)\Big]$$

where r is given by the following:

$$r(x) = \sqrt{(x_T-x_S)^2 + (y_T-y_S)^2 + (z_T-z_S)^2} \quad \text{(Eq. 9)}$$

According to the following, $\dot{r}$ is given by equation as:

$$\dot{r}(x) = \frac{1}{r(x)}((x_T - x_S)\dot{x}_T + (y_T - y_S)\dot{y}_T + (z_T - z_S)\dot{z}_T) \quad \text{(Eq. 10)}$$

Thus, the observation matrix also utilizes the results of the projection specified in equation of step 260 of the method. Once the Kalman filter is updated, the updated state (output 7) is output for a user or for other downstream processing.

Using the approach described above, the extended Kalman filter can operate on range-rate measurements directly in fusion coordinates, and is thus extremely efficient computationally. In this way, the range-rate and range of multiple sensors may be used as additional data for a Kalman filter to calculate the error of a predicted track state.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A method comprising the steps of:
providing a system comprising a plurality of radars each configured to obtain sensor data for at least one target, and a processor in communication with the plurality of radars, wherein the processor comprises a tracking filter;
obtaining, with the plurality of radars, sensor data regarding the target, wherein the sensor data comprises a range-rate measurement;
transmitting the obtained sensor data to the processor;
generating, by the processor utilizing a pulse-repetition interval of the system, a range hypothesis and a range-rate hypothesis for the target;
converting, by the processor, at least some of the obtained sensor data from the plurality of radars to a common coordinate system having an origin;
predicting, by the tracking filter using the obtained sensor data, a first track state for the target, wherein said prediction comprises an estimate of a position of the target and an estimate of a velocity of the target;
determining a a range vector to the target from each radar of the plurality of radars to obtain a first estimated position with respect to each radar of the plurality of radars, wherein the range vector is described in terms of the common coordinate system and is determined based on a vector from the origin to a respective radar of each of the plurality of radars and on a vector from the origin to the estimated position of the target;
determining in the common coordinate system, using the determined range vector, an estimate of a velocity of the target in the direction of each radar of the plurality of radars by projecting the estimated velocity of the target onto the range vector for each range vector respectively associated with a radar of the plurality of radars;
determining an error measurement by comparing the estimated velocity in the direction of each radar of the plurality of radars to the range-rate hypothesis for the target; and
updating the predicted first track state with the determined error measurement to generate a second track state for the target.

2. The method of claim 1, wherein the plurality of radars are in wireless communication with the processor.

3. The method of claim 1, wherein the obtained sensor data comprises one or more of the following: range of the target, range-rate of the target, azimuth angle of the target, and an elevation angle of the target.

4. The method of claim 1, wherein the common coordinate system is a Cartesian coordinate system.

5. The method of claim 1, wherein the step of determining a distance of each radar of the plurality of radars to the target comprises the formula
$$\vec{R} = \vec{T} - \vec{S}$$

where $\vec{R}$ is the distance from each radar to the target, $\vec{T}$ is a predicted distance from the processor to the target, and $\vec{S}$ is the distance from the processor to the radar.

6. The method of claim 1, wherein the estimate of a velocity of the target in the direction of each radar of the plurality of radars is determined using the formula $$\dot{R} = \vec{V} \cdot \frac{\vec{R}}{|\vec{R}|} = \vec{V} \cdot \frac{(\vec{T} - \vec{S})}{|\vec{T} - \vec{S}|}$$

where $\vec{R}$ is the distance from each radar to the target, $\vec{T}$ is a predicted distance from the processor to the target, and $\vec{S}$ is the distance from the processor to a radar.

7. The method of claim 1, wherein said processor comprises a Kalman filter.

8. A system comprising:
a processor; and
a plurality of radars each configured to obtain sensor data for at least one target, wherein the sensor data comprises a range-rate measurement, and further wherein the plurality of radars are configured to transmit obtained sensor data to the processor;
wherein the processor is configured to: (i) generate a range hypothesis and a range-rate hypothesis for the target utilizing obtained sensor data; (ii) convert at least some of the obtained sensor data from the plurality of radars to a common coordinate system having an origin; (iii) predict a first track state for the target, wherein said prediction comprises an estimate of a position of the target and an estimate of a velocity of the target; (iv) determine a range vector from each of the plurality of radars to the target to obtain a first estimated position with respect to each radar of the plurality of radars, wherein the range vector is described in terms of the common coordinate system and is determined based on a vector from the origin to a respective radar of each of the plurality of radars and on a vector from the origin to the estimated position of the target; (v) determine in the common coordinate system an estimate of a velocity of the target in the direction of each of the plurality of radars, by projecting the estimated velocity of the target onto the range vector for each range vector respectively associated with a radar of the plurality of radars; (vi) determine an error measurement by comparing the estimated velocity to the range-rate hypothesis for the target; and (vii) update the predicted first track state with the determined error measurement to generate a second track state for the target.

9. The system of claim 8, further comprising a communications network between the processor and one or more of the plurality of radars.

10. The system of claim 8, wherein the obtained sensor data comprises one or more of the following: range of the target, range-rate of the target, azimuth angle of the target, and an elevation angle of the target.

11. The system of claim 8, wherein the common coordinate system is a Cartesian coordinate system.

12. The system of claim 8, wherein the processor is configured to determine a distance to the target using the formula $$\vec{R} = \vec{T} - \vec{S}$$

where $\vec{R}$ is the distance from the radar to the target, $\vec{T}$ is a predicted distance from the processor to the target, and $\vec{S}$ is the distance from the processor to the radar.

13. The system of claim 8, wherein the processor is configured to estimate the velocity of the target in the direction of the radar using the formula $$\dot{R} = \overline{V} \cdot \frac{\overline{R}}{|\overline{R}|} = \overline{V} \cdot \frac{(\overline{T} - \overline{S})}{|\overline{T} - \overline{S}|}$$

where $\vec{R}$ is the distance from the radar to the target, $\vec{T}$ is a predicted distance from the processor to the target, and $\vec{S}$ is the distance from the processor to the radar.

14. The system of claim 8, wherein said processor comprises a Kalman filter.

15. A tracking system, the system comprising:
a processor configured to receive sensor data for at least one target from a plurality of radars, wherein the sensor data comprises a range-rate measurement;
wherein the processor is further configured to: (i) generate a range hypothesis and a range-rate hypothesis for the target utilizing obtained sensor data; (ii) convert at least some of the obtained sensor data from the plurality of radars to a common coordinate system having an origin; (iii) predict a first track state for the target, wherein said prediction comprises an estimate of a position of the target and an estimate of a velocity of the target; (iv) determine a range vector from each of the plurality of radars to the target to obtain a first estimated position with respect to each radar of the plurality of radars, wherein the range vector is described in terms of the common coordinate system and is determined based on a vector from the origin to a respective radar of each of the plurality of radars and on a vector from the origin to the estimated position of the target; (v) determine in the common coordinate system an estimate of a velocity of the target in the direction of each of the plurality of radars, by projecting the estimated velocity of the target onto the range vector for each range vector respectively associated with a radar of the plurality of radars; (vi) determine an error measurement by comparing the estimated velocity to the range-rate hypothesis for the target; and (vii) update the predicted first track state with the determined error measurement to generate a second track state for the target.

16. The system of claim 15, wherein the obtained sensor data comprises one or more of the following: range of the target, range-rate of the target, azimuth angle of the target, and an elevation angle of the target.

17. The system of claim 15, wherein the common coordinate system is a Cartesian coordinate system.

18. The system of claim 15, wherein the processor is configured to determine a distance to the target using the formula $$\vec{R} = \vec{T} - \vec{S}$$

where $\vec{R}$ is the distance from the radar to the target, $\vec{T}$ is a predicted distance from the processor to the target, and $\vec{S}$ is the distance from the processor to the radar.

19. The system of claim 15, wherein the processor is configured to estimate the velocity of the target in the direction of the radar using the formula $$\dot{R} = \overline{V} \cdot \frac{\overline{R}}{|\overline{R}|} = \overline{V} \cdot \frac{(\overline{T} - \overline{S})}{|\overline{T} - \overline{S}|}$$

where $\vec{R}$ is the distance from the radar to the target, $\vec{T}$ is a predicted distance from the processor to the target, and $\vec{S}$ is the distance from the processor to the radar.

20. The system of claim 15, wherein said processor comprises a Kalman filter.

* * * * *